Patented July 28, 1931

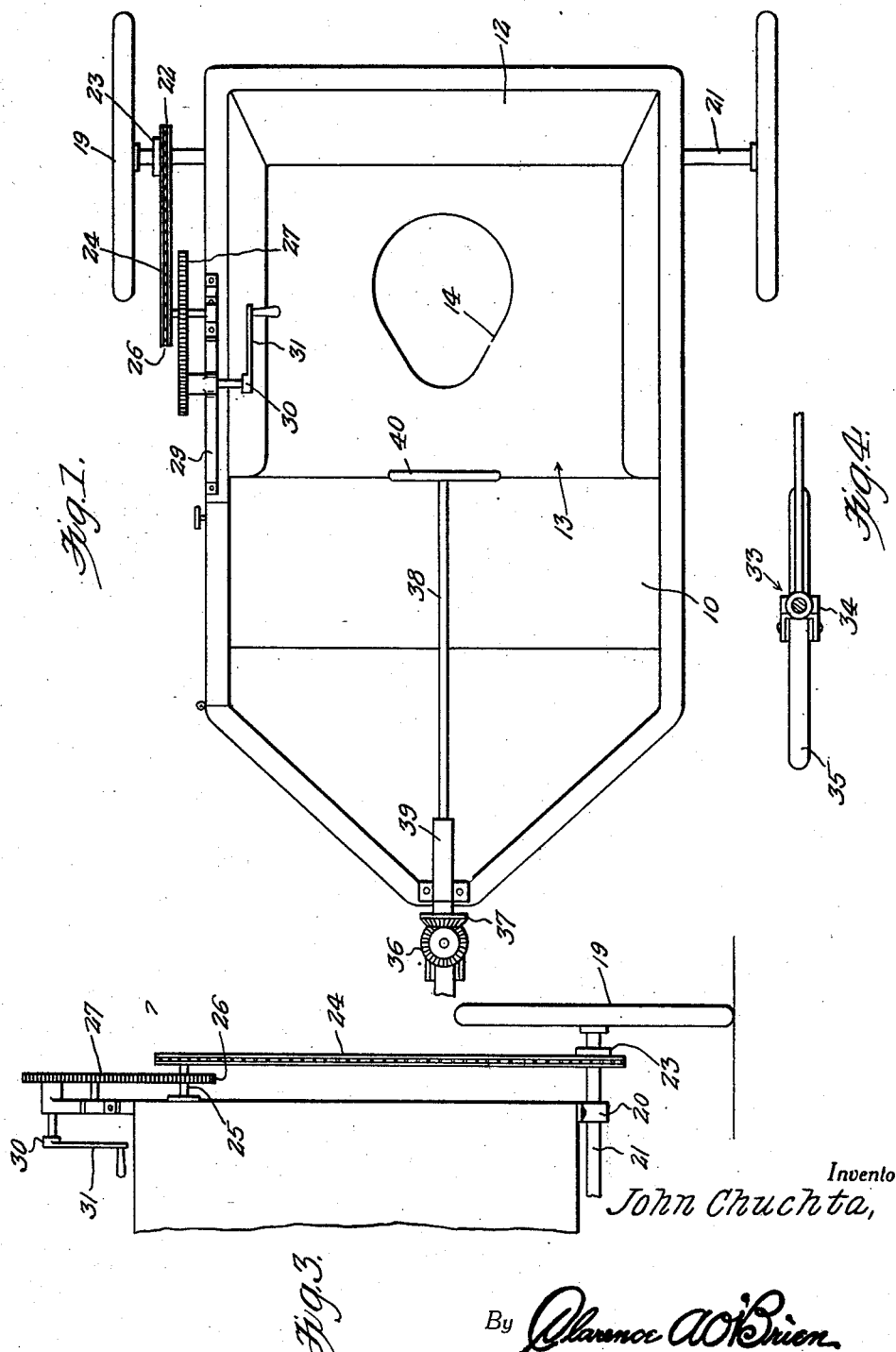

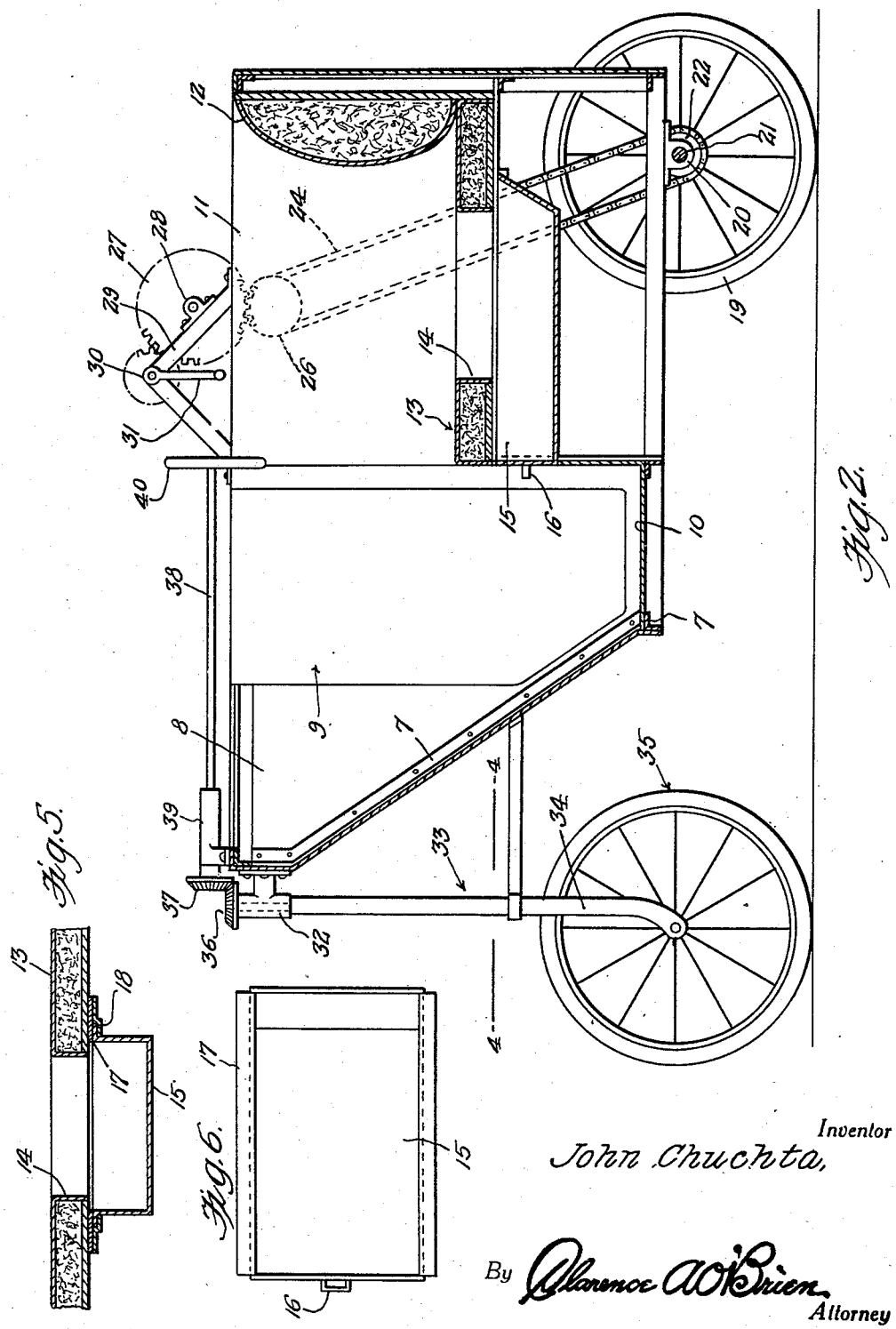

1,815,968

UNITED STATES PATENT OFFICE

JOHN CHUCHTA, OF OLYPHANT BOROUGH, PENNSYLVANIA

INVALID CAR

Application filed September 23, 1930. Serial No. 483,892.

This invention relates to a small vehicle or car designed to serve as a convenient conveyance for an invalid deprived of the use of limbs for walking, and it has more particular reference to a construction of this class which is especially, but not necessarily, in the form of a manually manipulated mechanically controlled vehicle which may be specifically referred to as a car.

One feature of the invention is founded on the embodiment in the structure of an all metal frame-work of rigid bar members associated in such a manner as to accommodate a protecting enclosure of sheet metal, so as to reasonably shield and comfortably house the occupant in the seat contained in said car.

A second feature is predicated upon the provision of a single front guide wheel and a dependable steering gear therefor including a hand wheel located within convenient reach of the occupant of the seat.

An additional feature is found in the provision of cushioned back and arm rests, as well as a seat cushion having a commode opening therein for co-operation with a slidable bedpan, said features being concealed by the surrounding enclosure of the body of the car.

A still further feature of the invention is the drive, which is primarily gearing and socket arrangements including a coaster brake to expedite efficient handling of the conveyance.

Other features and advantages will become more readily apparent from the following description and drawings.

In the drawings:

Figure 1 is a top plan view of the complete invalid car constructed in accordance with the present invention.

Figure 2 is a longitudinal vertical sectional view through the same.

Figure 3 is a fragmentary rear end view showing the sprocket and gearing drive.

Figure 4 is a horizontal section on the line 4—4 of Figure 2.

Figures 5 and 6 are detail views of the bedpan and mounting.

The entire assembly may well be seen in Figure 2. The chassis or frame is constructed from an appropriate assembly of frame bars 7 preferably in the form of angleirons. Metal walls of sheet metal of appropriate strength indicated at 8 are fastened around the frame to form an enclosure or body for the vehicle. The numeral 9 designates hingedly mounted door. The numeral 10 represents the foot rest. The numerals 11 designate the padded side walls or arm rests and 12 indicates the cushion or padded backrest. The seat cushion is generally designated by the numeral 13 and is removably placed on the elevated supporting means therefor. Incidently it will be observed that this seat is formed with an appropriately shaped commode opening or hole as at 14 and this is in registry with a bedpan 15 having an appropriate handle 16 and supporting flanges 17 slidably mounted in guides 18 as shown in Figures 5 and 6.

All of the wheels are rubber-tired solid cushion or pneumatic type. The drive wheels are distinguished by the numerals 19 and are mounted on the axles 20 journalled in bearings 21. At one end of the drive shaft is a sprocket wheel 22 and an associated coaster brake 23 of appropriate construction. The sprocket chain 24 is trained over the sprocket 22 at the lower end and over an additional sprocket at the upper end carried by a rotatable stub shaft 25 as seen in Figure 3.

On this stubshaft is a driving gear 26 in mesh with an idler gear 27. The idler gear is mounted in a bearing 28 on the V-shaped support 29. This support also carries a propulsion pinion 30 in mesh with the gear 29 and provided with a handcrank 31 within convenient reach of the occupant of the car.

At the front of the structure near the top is a bearing bracket 32 to accommodate the upper end of the oscillatory standard 33. On the standard's bottom is a fork 34 for supporting the front guide wheel 35. On the top of the shaft or standard 33 is a bevel gear 36 in mesh with the companion gear 37. This companion gear is on the steering rod 38 and the steering rod is mounted in a bearing bracket 39.

On the inner end of the steering rod is a steering wheel 40 within convenient reach of the occupant of the seat.

In practice, it is obvious that the occupant enters the car by way of the door 9. When seated on the cushion 13, the occupant catches hold of the hand crank 31 and rotates it in a direction to bring the propulsion sprocket chain and gearing mechanism into play for rotating the ground engaging or traction wheels 19. This propels the car along in an obvious fashion.

In the event it is desired to stop the car, the handcrank is rotated a part turn in a retrograde direction, thus bringing into play the coaster brake device 23 and stopping the car. This is a prominent safety feature for an invalid appliance of this class. It is evident that the steering is accomplished through the medium of the steering wheel 40, and the associated guide wheel 35 and operating connection between the wheels 35 and 40 respectively.

As before pointed out, the apertured seat cushion 13 is convenient for rendering the bedpan 15 readily accessible for usage whenever necessary or desired. This is a comforting feature of the invention. Likewise, the padded walls comprising the features 11 and 12 associated with the cushioned seat 13 are factors to be emphasized. All of these elements are structurally coordinated to provide a portable dependable invalid car which will fulfill the requirements of an appliance of this class.

It is thought that persons skilled in the art to which the invention relates will be able to obtain a clear understanding of the invention after considering the description in connection with the drawings. Therefore, a more lengthy description is regarded as unnecessary.

Minor changes in shape, size, and rearrangement of details coming within the field of invention claimed may be resorted to in actual practice if desired.

I claim:

1. In a portable invalid car of the class described, a wheel supported frame and body structure, an elevated seat support therein, a removable cushion on said support, horizontal guides carried by said support, a slidable bedpan in said guides, said cushion having a commode hole in registry with said pan and said pan underlying said hole.

2. In a portable invalid car of the class described, a wheel supported frame and body structure, an elevated seat support therein, a removable cushion on said support, horizontal guides carried by said support, a slidable bedpan in said guides, said cushion having a commode hole in registry with said pan and said pan underlying said hole, together with internal padded side arm rests and a backrest surrounding said seat cushions for comforting the occupant of the car.

In testimony whereof I affix my signature.

JOHN CHUCHTA.